United States Patent
Glovier et al.

(10) Patent No.: US 12,004,442 B2
(45) Date of Patent: Jun. 11, 2024

(54) SYSTEM AND METHOD FOR DETECTING MATERIAL ACCUMULATION RELATIVE TO ROTATING GROUND-PENETRATING TOOLS OF AN AGRICULTURAL IMPLEMENT

(71) Applicant: CNH Industrial America LLC, New Holland, PA (US)

(72) Inventors: Scott Glovier, Lombard, IL (US); Michael R. Cozza, Pittsburgh, PA (US); Heather Humphreys Paxinos, Burr Ridge, IL (US); Jian Jiao, Hinsdale, IL (US)

(73) Assignee: CNH Industrial America LLC, New Holland, PA (US)

( * ) Notice: Subject to any disclaimer, the term of this patent is extended or adjusted under 35 U.S.C. 154(b) by 414 days.

(21) Appl. No.: 17/238,876

(22) Filed: Apr. 23, 2021

(65) Prior Publication Data
US 2022/0338405 A1   Oct. 27, 2022

(51) Int. Cl.
*A01B 79/00* (2006.01)
*A01B 5/04* (2006.01)
(Continued)

(52) U.S. Cl.
CPC .............. *A01B 79/005* (2013.01); *A01B 5/04* (2013.01); *G01P 3/38* (2013.01); *G01P 3/487* (2013.01); *A01B 39/08* (2013.01); *A01B 63/008* (2013.01)

(58) Field of Classification Search
CPC ..... A01B 79/005; A01B 39/08; A01B 63/008; A01B 15/16; A01B 5/04; A01B 5/00; G01P 3/38; G01P 3/487
See application file for complete search history.

(56) References Cited

U.S. PATENT DOCUMENTS 8,408,149 B2   4/2013 Rylander
9,485,900 B2   11/2016 Connell et al.
(Continued)

OTHER PUBLICATIONS

Cdi, 'Discing question ??,' last response in thread dated Apr. 24, 2010, accessed Dec. 17, 2023, AgTalk, <https://talk.newagtalk.com/forums/thread-view.asp?tid=163303>.*

*Primary Examiner* — Thomas B Will
*Assistant Examiner* — Joel F. Mitchell
(74) *Attorney, Agent, or Firm* — Rebecca L. Henkel; Peter K. Zacharias; Rickard K. DeMille (57) ABSTRACT

A system for detecting material accumulation relative to rotating ground-penetrating tools of an agricultural implement includes an agricultural implement having a frame and at least one rotating ground-penetrating tool supported relative to the frame. The rotating ground-penetrating tool(s) is configured to penetrate into the ground to a given penetration depth. The system also includes a tool speed sensor configured to provide data indicative of a rotational speed of the ground-penetrating tool(s) and a computing system communicatively coupled to the tool speed sensor. The computing system is configured to monitor the rotational speed of the ground-penetrating tool(s) based on the data provided by the tool speed sensor, determine a threshold rotational speed based at least in part on the penetration depth of the ground-penetrating tool(s), and determine when the rotational speed of the ground-penetrating tool(s) falls below the threshold rotational speed.

17 Claims, 6 Drawing Sheets

(51) Int. Cl.
    *G01P 3/38*     (2006.01)
    *G01P 3/487*     (2006.01)
    *A01B 39/08*     (2006.01)
    *A01B 63/00*     (2006.01)

(56) References Cited

U.S. PATENT DOCUMENTS

| | | | |
|---|---|---|---|
| 10,492,353 B2 * | 12/2019 | Kovach et al. | A01B 49/027 |
| 2019/0239413 A1 | 8/2019 | Degarmo | |
| 2020/0107494 A1 | 4/2020 | Schoeny et al. | |
| 2020/0107498 A1 | 4/2020 | Anderson et al. | |
| 2020/0305335 A1 * | 10/2020 | Schoeny et al. | A01B 71/08 |
| 2021/0045276 A1 * | 2/2021 | Henry | A01B 71/08 |
| 2022/0279706 A1 * | 9/2022 | Boufleur et al. | A01C 7/08 |

\* cited by examiner

SYSTEM AND METHOD FOR DETECTING MATERIAL ACCUMULATION RELATIVE TO ROTATING GROUND-PENETRATING TOOLS OF AN AGRICULTURAL IMPLEMENT

FIELD OF THE INVENTION

The present disclosure generally relates to agricultural implements and, more particularly, to systems and methods for detecting material accumulation relative to rotating ground-penetrating tools of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more tools configured to engage the soil as the implement is moved across the field. For example, in certain configurations, the implement may include one or more harrow disks, leveling disks, rolling baskets, shanks, tines, and/or the like. Such tools loosen and/or otherwise agitate the soil to prepare the field for subsequent planting operations.

During tillage operations, field materials, such as residue, soil, rocks, and/or the like, may become trapped or otherwise accumulate between adjacent tools. Such accumulations of field materials may inhibit the operation of the tools in a manner that prevents the tools from providing adequate tillage to the field. In such instances, it is necessary for the operator to take certain corrective actions to remove the material accumulation. However, it may be difficult for the tillage implement operator to determine when material accumulation occurs between the tools.

Accordingly, a system and related method for detecting material accumulation relative to tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting material accumulation relative to rotating ground-penetrating tools of an agricultural implement. The system includes an agricultural implement having a frame and at least one rotating ground-penetrating tool supported relative to the frame. The rotating ground-penetrating tool(s) is configured to penetrate into the ground to a given penetration depth. The system also includes a tool speed sensor configured to provide data indicative of a rotational speed of the ground-penetrating tool(s) and a computing system communicatively coupled to the tool speed sensor. The computing system is configured to monitor the rotational speed of the ground-penetrating tool(s) based on the data provided by the tool speed sensor, determine a threshold rotational speed based at least in part on the penetration depth of the ground-penetrating tool(s), and determine when the rotational speed of the ground-penetrating tool(s) falls below the threshold rotational speed.

In another aspect, the present subject matter is directed to an agricultural implement including a frame and a disk gang assembly supported relative to the frame, with the disk gang assembly including a plurality of disk blades. The disk blades are configured to penetrate into the ground to a given penetration depth. The implement also includes a tool speed sensor configured to provide data indicative of a rotational speed of at least one disk blade of the plurality of disk blades and a computing system communicatively coupled to the tool speed sensor. The computing system is configured to monitor the rotational speed of the at least one disk blade based on the data provided by the tool speed sensor, determine a threshold rotational speed for the at least one disk blade based at least in part on the penetration depth associated with the at least one disk blade, and determine when the rotational speed of the at least one disk blade falls below the threshold rotational speed.

In a further aspect, the present subject matter is directed to method for detecting material accumulation relative to rotating ground-penetrating tools of an agricultural implement. The agricultural implement includes a frame and at least one rotating ground-penetrating tool supported relative to the frame, with the rotating ground-penetrating tool(s) being configured to penetrate into the ground to a given penetration depth. The method includes monitoring, with a computing system, a rotational speed of the ground-penetrating tool(s), determining, with the computing system, a threshold rotational speed based at least in part on the penetration depth of the ground-penetrating tool(s), comparing, with the computing system, the rotational speed of the ground-penetrating tool(s) to the threshold rotational speed, and initiating, with the computing system, a control action when it is determined that the rotational speed of the ground-penetrating tool(s) has fallen below the threshold rotational speed.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting material accumulation relative to rotating ground-penetrating tools of an agricultural implement. Specifically, in several embodiments, a computing system may be configured to monitor the rotational speed of one or more ground-penetrating tools and compare such monitored speed to an associated rotational speed threshold to determine or infer when the tool(s) is experiencing (or beginning to experience) a plugged condition or state. For example, in one embodiment, the rotational speed threshold may be selected such that, when the rotational speed of the rotating ground-penetrating tool(s) is at or above the threshold, it may be determined or inferred that the tool(s) is not plugged. However, when the rotational speed of the tool(s) drops below the threshold, it can be determined or inferred that the tool(s) is plugged or is otherwise experiencing plugging-related conditions. Upon determining that the tool(s) is plugged, the computing system may be configured to automatically initiate a control action, such as by generating an operator notification and/or automatically adjusting the operation of the implement and/or the work vehicle that is towing the implement.

Additionally, in accordance with aspects of the present subject matter, the computing system may be configured to vary the rotational speed threshold utilized for making such plugging-related determinations as a function of one or more operating conditions/parameters. For instance, in several embodiments, the rotational speed threshold may be varied as a function of the penetration depth of the rotating ground-penetrating tool(s) to account for variations in the slippage of the tool(s) at different depths within the soil. Specifically, as will be described below, the present inventors have discovered that the amount or percentage of slip occurring on rotating ground-penetrating tools generally varies as a function of the penetration depth of such tools. Moreover, in one embodiment, the rotational speed threshold may also be varied as a function of the penetration depth in combination with one or more other operating conditions/parameters, such as the ground speed of the agricultural implement and/or one or more field-related operating conditions (e.g., the crop type previously planted within the field, percent soil moisture, soil type, etc.).

Figure 1:
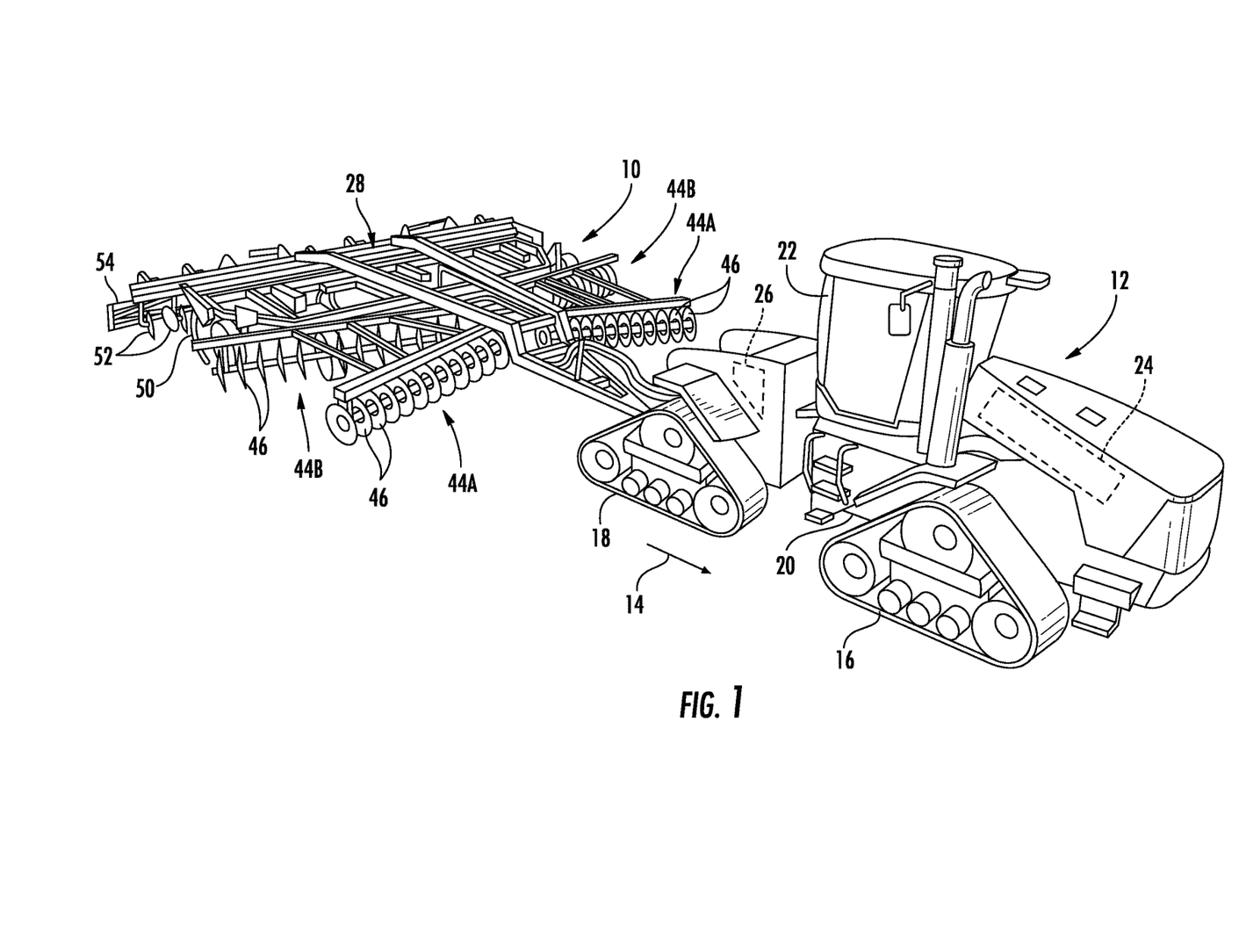
FIG. 1 illustrates a perspective view of one embodiment of an agricultural implement in accordance with aspects of the present subject matter.
Figure 2:
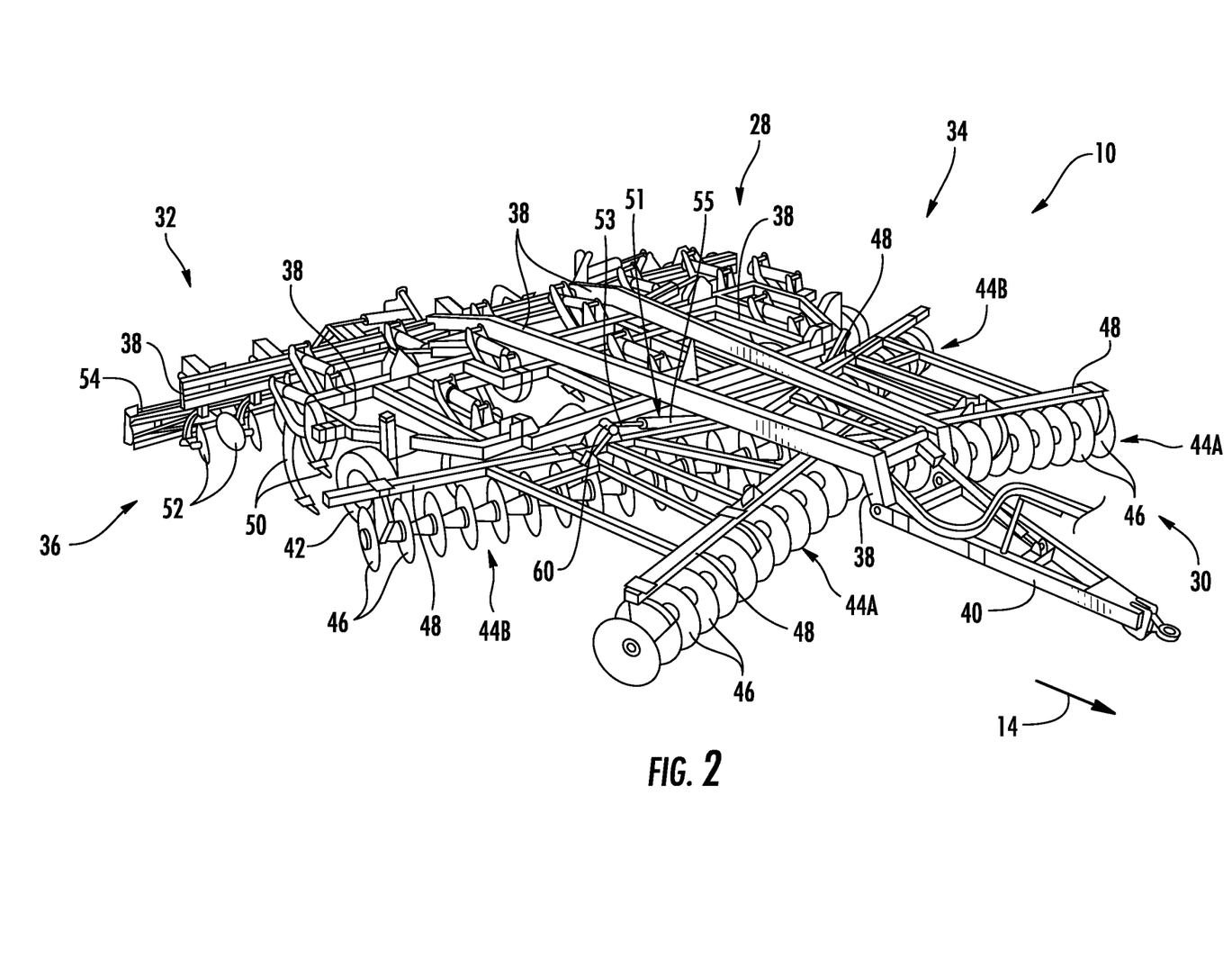
FIG. 2 illustrates another perspective view of the agricultural implement in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair of rear track assemblies 18, and a frame or chassis 20 coupled to and supported by the track assemblies 16, 18. An operator's cab 22 may be supported by a portion of the chassis 20 and may house various input devices (e.g., a user interface 23) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, one or more ground engaging tools may be coupled to and/or supported by the frame 28. In such embodiments, the ground engaging tool(s) may, for example, include one or more ground-penetrating tools. More particularly, in certain embodiments, the ground engaging tools may include one or more disk blades 46 and/or shanks 50 supported relative to the frame 28. In one embodiment, each disk blade 46 and/or shank 50 may be individually supported relative to the frame 28. Alternatively, one or more groups or sections of the ground engaging tools may be ganged together to form one or more ganged tool assemblies, such as the disk gang assemblies 44 shown in FIGS. 1 and 2.

As illustrated in FIG. 2, each disc gang assembly 44 includes a toolbar 48 coupled to the implement frame 28 and a plurality of disk blades 46 supported by the toolbar 48 relative to the implement frame 28. Each disk blade 46 may, in turn, be configured to penetrate into or otherwise engage the soil as the implement 10 is being pulled through the field. As is generally understood, the various disk gang assemblies 44 may be oriented at an angle relative to the direction of travel 14 to promote more effective tilling of the soil. In the embodiment shown in FIGS. 1 and 2, the implement 10 includes four disk gang assemblies 44 supported relative to the frame 28 at a location forward of the shanks 50. Specifically, the implement 10 includes a pair of front disk gang assemblies 44A and a pair of rear disc gang assemblies 44B positioned aft or rearward of the front disk gang assemblies 44A relative to the direction of travel 14 of the implement 10. However, it should be appreciated that, in alternative embodiments, the implement 10 may include any other suitable number of disk gang assemblies 44, such as more or less than four disk gang assemblies 44. Furthermore, in one embodiment, the disk gang assemblies 44 may be mounted to the frame 28 at any other suitable location, such as adjacent to its aft end 32.

Moreover, in several embodiments, the implement 10 may include a plurality of disk gang actuators 51 (one of which is shown in FIG. 2), with each actuator 51 being configured to move or otherwise adjust the orientation or position of one of the disk gang assemblies 44 relative to the implement frame 28. For example, as shown in FIG. 2, a first end of each actuator 51 (e.g., a rod 53 of the actuator 51) may be coupled to a toolbar 48 of the corresponding disk gang assembly 44, while a second end of each actuator 51 (e.g., the cylinder 55 of the actuator 51) may be coupled to the frame 28. The rod 53 of each actuator 51 may be configured to extend and/or retract relative to the corresponding cylinder 55 to adjust the penetration depth of the associated disk blades 46. In the illustrated embodiment, each actuator 51 corresponds to a fluid-driven actuator, such as a hydraulic or pneumatic cylinder. However, it should be appreciated that each actuator 51 may correspond to any other suitable type of actuator, such as an electric linear actuator.

It should be appreciated that, in addition to the shanks 50 and the disk blades 46, the implement frame 28 may be configured to support any other suitable ground engaging tools, including any other suitable ground-penetrating tools. For instance, in the illustrated embodiment, the frame 28 is also configured to support a plurality of leveling blades 52 and rolling (or crumbler) basket assemblies 54. In other embodiments, any other suitable tools may be coupled to and/or supported by the implement frame 28, such as a plurality closing disks.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
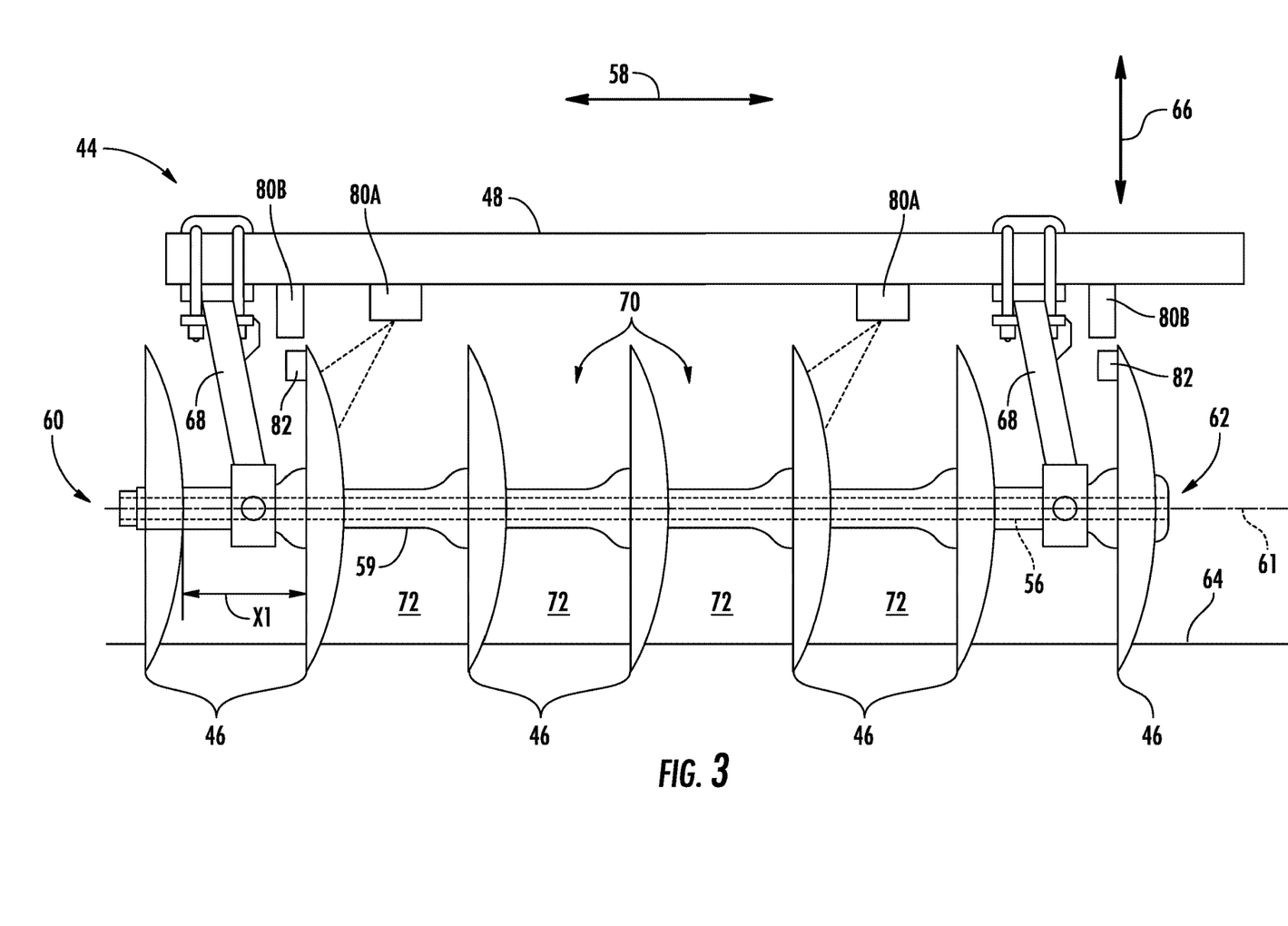
FIG. 3 illustrates a front view of one embodiment of a disk gang assembly of an agricultural implement in accordance with aspects of the present subject matter.
Figure 4:
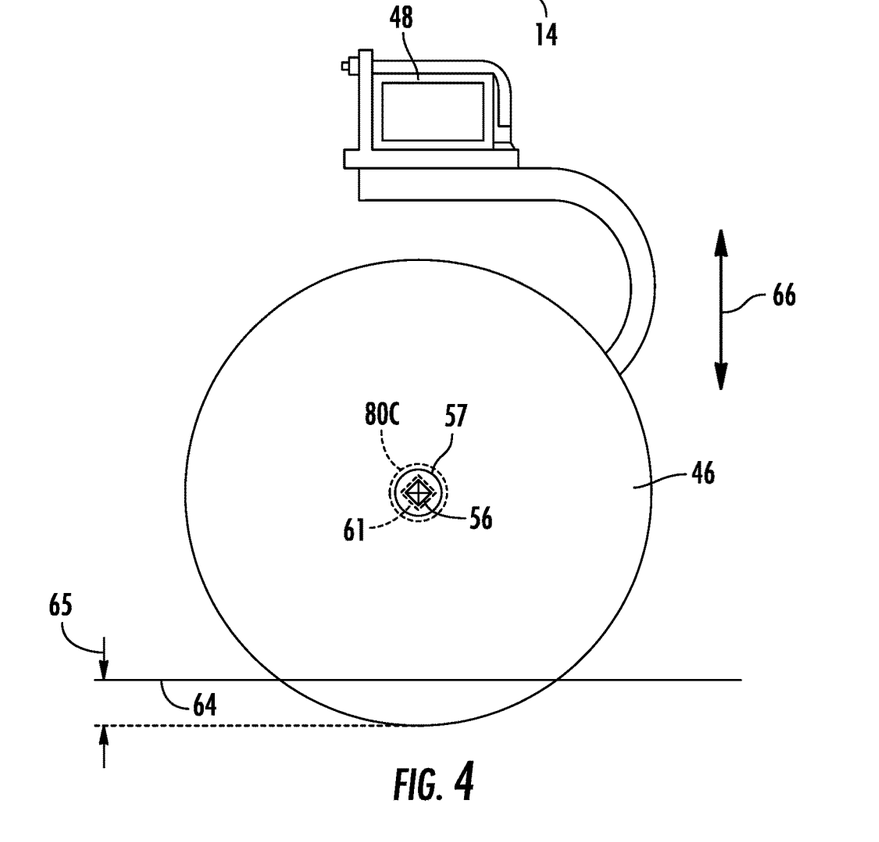
FIG. 4 illustrates an end view of the disk gang assembly shown in FIG. 3.

Referring now to FIGS. 3 and 4, exemplary views of a disk gang assembly are illustrated in accordance with aspects of the present subject matter. More particularly, FIG. 3 illustrates a front view of one of the disk gang assemblies 44 described above with reference to FIGS. 1 and 2. Additionally, FIG. 4 illustrates an end view of the disk gang assembly 44 shown in FIG. 3.

As shown in FIG. 3, the disk gang assembly 44 may include a disk gang shaft (e.g., as indicated with dashed lines 56) that extends along an axial direction of the disk gang assembly 44 (e.g., as indicated by arrow 58) between a first end 60 and a second end 62. The disk gang shaft 56 may be positioned below the toolbar 48 of the disk gang assembly 44 along a vertical direction (e.g., as indicated by arrow 66) of the implement 10 and supported relative to the toolbar 48 by one or more hangers 68. However, in alternative embodiments, the disk gang shaft 56 may have any other suitable orientation. Each disk blade 46 may be rotatably coupled or keyed to the disk gang shaft 56 by a bearing 57 (FIG. 4). However, in some embodiments, the disk blades 46 may be directly coupled to the disk gang shaft 56. The disk gang shaft 56 defines a rotational axis (e.g., as indicated by dashed line 61) about which the coupled disk blades 46 rotate. Each disk blade 46 may be spaced apart from an adjacent disk blade 46 in the axial direction 58 via spools 59 by a distance X1. An open space 70 is thus defined between each pair of adjacent disk blades 46 in the axial direction 58.

As the implement 10 is moved across a field, the disk blades 46 may be configured to penetrate the soil surface (e.g., as indicated by line 64) of the field to a given penetration depth 65 (FIG. 4) and rotate about the rotational axis relative to the soil such that field materials flow through the open spaces 70. It should be appreciated that during normal, non-plugged operation of the disk gang assembly 44, substantially all of the field materials being processed by the disk gang assembly 44 flow through the open spaces 70, particularly through portion(s) of open spaces 70 defined below the rotational axis 61 (i.e., through lower flow zone(s) 72), with only an occasional piece of residue, dirt clod, rock, and/or the like flowing above the disk gang shaft 56.

In certain instances, however, a plugged condition or state may occur in which field materials accumulate within the flow zone(s) 72. For example, when the soil in the field has high moisture content, the soil may stick or adhere to the disk blades 46 such that the soil accumulates within the associated flow zone(s) 72. Moreover, a large chunk of residue or a rock may become lodged between a pair of adjacent disk blades 46 in a manner that inhibits the flow of field materials through the associated flow zone(s) 72, thereby causing additional field materials to accumulate therein. As such, the disk blades 46 may become plugged and not perform as intended. Such plugging typically results in the rotational speed of the disk blades 46 being reduced. For instance, as materials accumulate relative to the disk blades 46, the rotational resistance or friction applied by such materials may result in the rotation of the blades 46 being slowed or even stopped. Slowing or stopping of the rotation of the disk blades 46 typically prevents the blades 46 from properly working the soil and can lead to undesirable tillage results (e.g., a lack of breaking-up of the soil or the generation of undesirable surface features, such as ridges or furrows).

In several embodiments, the rotational speed of the disk blades 46 may be monitored using one or more tool speed sensors 80 provided in operative association with the disk gang assembly 44. In general, the tool speed sensor(s) 80 may correspond to any suitable sensing device or system configured to provide or generate data indicative of the rotational speed of one or more of the disk blades 46 of the disk gang assembly 44. Various different examples of tool speed sensors 80 that can be used to monitor the rotational speed of the disk blades 46 are shown in FIGS. 3 and 4. For instance, as shown in FIG. 3, in one embodiment, one or more optical speed sensors 80A (e.g., cameras) may be supported relative to the disk blades 46 (e.g., by mounting the sensor(s) 80A to the toolbar 48) to detect the rotational speed of one or more disk blades. In another embodiment, as shown in FIG. 3, a magnetic sensor 80A may be coupled to a non-rotating portion of the disk gang assembly 44 so that it can detect the presence of a magnet 82 provided in association with a corresponding disk blade 46. In such an embodiment, by detecting the frequency at which the magnet 82 passes by the magnetic sensor 80B, the rotational speed of the disk blade 46 can be determined. In yet another embodiment, a rotational speed sensor 80C (FIG. 4) (e.g., an inductive, capacitive, or optical sensor) may be provided in association with each bearing 57 of the disk gang assembly 44. As such, by monitoring the rotational speed of a component of the bearing 57 or a portion of the disk blade 46 at the bearing/blade interface, the rotational speed of the disk blade 46 can be determined. In further embodiments, the tool speed sensor(s) 80 may correspond to any other suitable sensing device or system configured to provide an indication of the rotational speed of one or more of the disk blades 46 of the disk gang assembly 44.

In accordance with aspects of the present subject matter, to determine or infer when the disk blades 46 are experiencing (or beginning to experience) a plugged condition or state, the rotational speed of the disk blades 46 (as detected via the tool speed sensor(s) 80) is compared to a rotational speed threshold. In several embodiments, the rotational speed threshold is selected such that, when the rotational speed of the disk blades 46 is at or above the threshold, it may be determined or inferred that the blades 46 are not plugged. However, when the rotational speed of the disk blades 46 drops below the threshold, it can be determined or inferred that the blades 46 are plugged or are otherwise experiencing plugging-related conditions.

In several embodiments, the rotational speed threshold utilized for making such plugging-related determinations generally corresponds to a dynamic threshold that is varied as a function of one or more operating conditions/parameters. For instance, as will be described in greater detail below, the rotational speed threshold may be varied as a function of the penetration depth 65 of the disk blades 46 to account for variations in the slippage of the blades 46 at different depths within the soil. Additionally, in one embodiment, the rotational speed threshold may be varied as a function of the penetration depth 65 in combination with one or more other operating conditions/parameters, such as the ground speed of the agricultural implement 10 and/or one or more field-related operating conditions (e.g., the crop type previously planted within the field, percent soil moisture, soil type, etc.).

Figure 5:
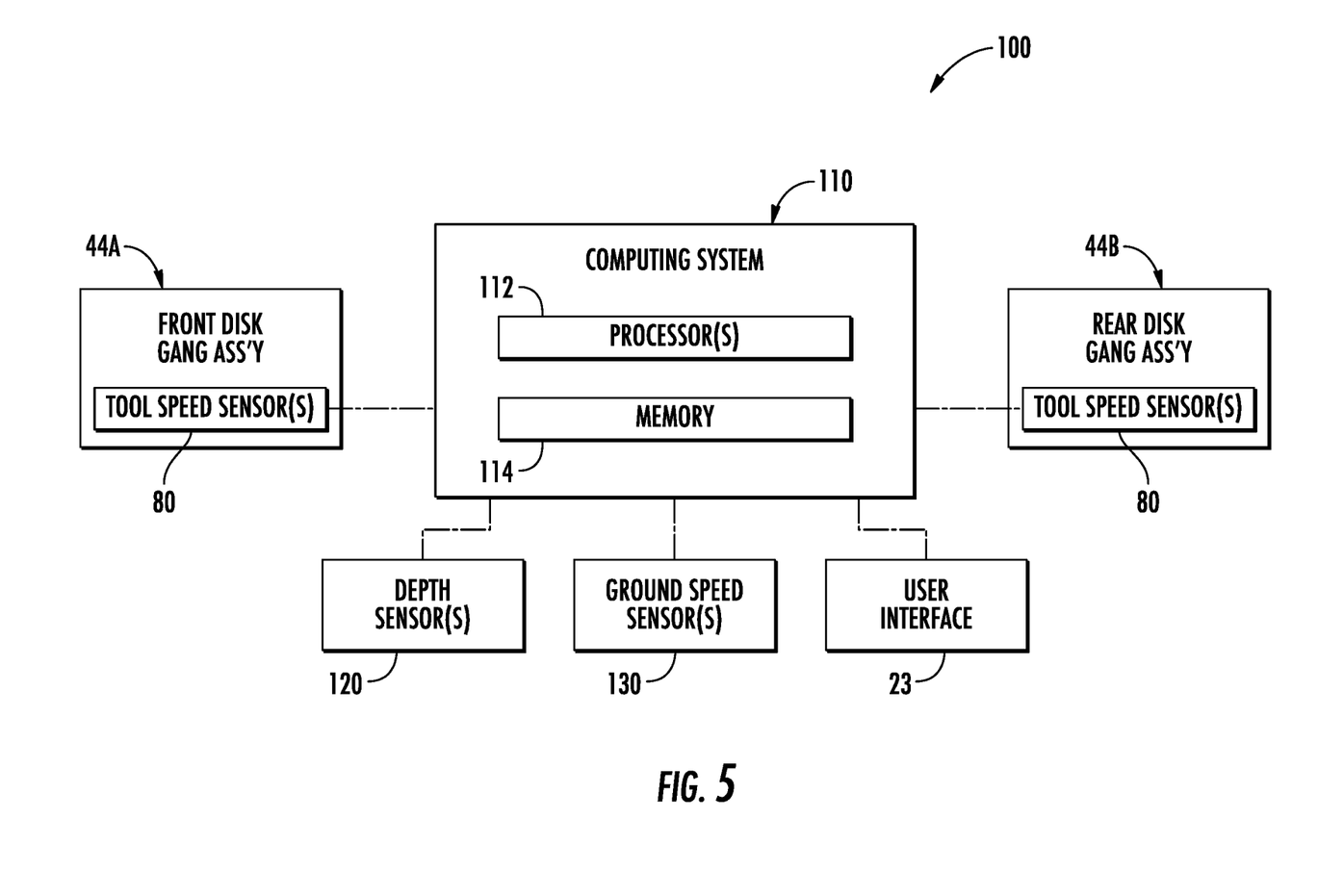
FIG. 5 illustrates a schematic view of one embodiment of a system for detecting material accumulation relative to rotating ground-penetrating tools of an agricultural implement in accordance with aspects of the present subject matter.

Referring now to FIG. 5, a schematic view of one embodiment of a system 100 for detecting material accumulation relative to rotating ground-penetrating tools of an agricultural implement is illustrated in accordance with aspects of the present subject matter. In general, the system 100 will be described herein with reference to the implement 10 and disk gang assemblies 44 described above with reference to FIGS. 1-4. However, it should be appreciated by those of ordinary skill in the art that the disclosed system 100 may generally be utilized with tillage implements having any other suitable implement configuration as well as disk gang assemblies having any other suitable configuration. Additionally, even though the system 100 will generally be described herein with reference to the detection of material accumulation relative to one or more disk gang assemblies, it should be appreciated the present disclosure is generally applicable to any rotating ground-penetrating tool, including individually mounted disk blades and/or any other rotating tools of an agricultural implement that penetrate through the soil surface to a given depth.

In general, the system 100 may include one or more components of an agricultural implement, such as one or more of the components of the implement 10 described above. For example, as shown in FIG. 5, the system 100 may include one or more disk gang assemblies, such as one or more of the front disk gang assemblies 44A and/or one or more of the rear disk gang assemblies 44B of the implement 10. Each disk gang assembly 44 may generally be provided in operative association with one or more tool speed sensors (e.g., the tool speed sensors 80 described above) configured to provide data indicative of the rotational speed of one or more of the disk blades 46 of such assembly 44. For instance, depending on the number and configuration of the tool speed sensors 80 being utilized, the sensors 80 may be configured to provide data indicative of the rotational speed of each individual disk blade 46 of a given disk gang assembly 44 or data indicative of the rotational speed of one or more selected disk blades 46 of a given disk gang assembly 44. When the rotational speed of only a select number of disk blades 46 is being monitored, the detected speed(s) may be used to infer or calculate a rotational speed of the remaining disk blades 46 of the associated disk gang assembly 44 (e.g., by inferring that the remaining blades 46 are rotating at the same speed (or average speed) of the monitored blades 46).

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

In several embodiments, the computing system 110 may be configured to monitor the rotational speed of one or more disk blades 46 of the implement 10 relative to an associated rotational speed threshold. Specifically, in one embodiment, the computing system 110 may be communicatively coupled to the tool speed sensor(s) 80 provided in association with one or more of the disk gang assemblies 44 (e.g., via a wired or wireless connection) to allow the rotational speed of one or more corresponding disk blades 46 of such assembly(ies) 44 to be monitored. The monitored disk speed may then be compared to the associated rotational speed threshold to determine or infer the "plugging" status of the corresponding disk blade(s) 46. For example, in one embodiment, the computing system 110 may be configured to determine or infer that the corresponding disk blade(s) 46 are in a non-plugged state when the rotational speed of the blade(s) 46 is at or above the threshold and that the disk blade(s) 46 are in a plugged state when the rotational speed of the blade(s) 46 is below the threshold As indicated above, the rotational speed threshold used to infer or determine the "plugging" status of the disk blade(s) 46 may be varied based on one or more operating conditions/parameters. In several embodiments, the computing system 110 may be configured to calculate or select an applicable threshold value for the rotational speed threshold based on the current penetration depth 65 of the associated disk blade(s) 46. Specifically, the present inventors have discovered that the amount or percentage of slip occurring on the disk blades 46 generally varies as a function of penetration depth 65 of such blades 46. Accordingly, given the variation in the amount or percentage of slip as the penetration depth changes, the disclosed computing system 110 may be configured similarly vary the rotational speed threshold being used to determine the "plugging" status of the disk blade(s) 46. For example, the computing system 110 may be configured to generally decrease the threshold value associated with the rotational speed threshold when a higher amount or percentage of slip is anticipated. This lower threshold value allows the system 100 to accommodate greater amounts of slippage without providing false positives (i.e., inferring that the disk blade(s) 46 are plugged when, in fact, the blades 46 are simply subject to increased slippage due to their current penetration depth).

Figure 6:
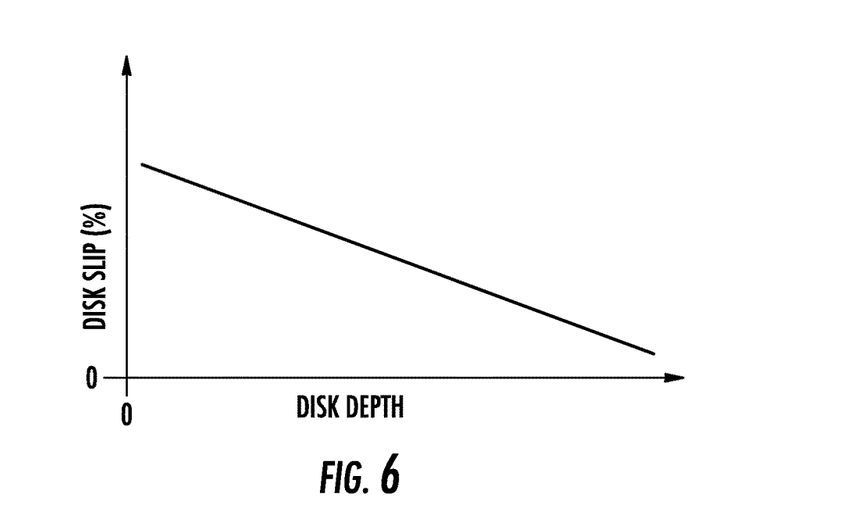
FIG. 6 illustrates a graph plotting an exemplary relationship between the penetration depth of disk blades of an agricultural implement and the amount or percent slippage of such blades in accordance with aspects of the present subject matter.

For instance, FIG. 6 illustrates a graph plotting an exemplary relationship between the penetration depth of disk blades (on the x-axis) and the amount or percent slippage of such blades (on the y-axis). As shown, an inverse relationship generally exists between the percent slippage and the penetration depth of the disk blades. Specifically, the percent slippage of the disk blades generally decreases with increases in the penetration depth. Thus, at shallower depths, the disk blades are generally subject to increased slippage. Accordingly, to avoid false positives when determining or inferring the plugging-related status of the disk blades, the rotational speed threshold may be varied as a function of the penetration depth, with the threshold speed value associated with such threshold decreasing with reductions in the penetration depth (and/or increasing with increases in the penetration depth).

Referring back to FIG. 5, to select the applicable rotational speed threshold, the computing system 110 may generally be configured to receive an input associated with the current penetration depth 65 of the disk blades 46. In one embodiment, this input may be received from the operator. For instance, the operator may select or input the desired or current penetration depth 65 via the user interface 23 provided within the cab 22 of the work vehicle 12. Alternatively, the computing system 110 may be configured to actively monitor the current penetration depth 65 of the disk blades 46 via sensor feedback provided by one or more depth sensors 120. For example, in one embodiment, each depth sensor(s) 120 may correspond to a pressure sensor or position sensor provided in operative association with a corresponding disk gang actuator(s) 51 of the implement 10. In such an embodiment, the sensor(s) may be configured to monitor the extent to which the actuator 51 has been extended/retracted, thereby allowing the computing system 110 to determine or infer the penetration depth 65 of the disk blades 46 based on the extended/retracted state of the actuator 51. In another embodiment, each depth sensor(s) 120 may correspond to a position sensor (e.g., a rotary or linear potentiometer) configured to monitor the relative position between the toolbar 48 of the corresponding disk gang assembly 44 and the implement's main frame, 28 thereby allowing the computing system 110 to determine or infer the penetration depth 65 of the disk blades 46 based on such position data. In even further embodiments, the computing system 110 may be communicatively coupled to any other suitable depth sensor(s) or feedback device(s) that allows the computing system 110 to directly or indirectly monitor/infer the penetration depth 65 of the disk blades 46.

It should be appreciated that the computing system 110 may be configured to select an applicable threshold value for the rotational speed threshold based on the penetration depth 65 of the disk blades 46 using any suitable means and/or methodology. For instance, in one embodiment, a look-up table or suitable mathematical relationship may be stored within the computing system's memory 114 that correlates threshold values to penetration depths, thereby allowing the computing system 110 to select an appropriate rotational speed threshold as a function of the current penetration depth 65.

Moreover, in addition to the penetration depth 65 of the disk blades 46, the computing system 110 may also be configured to vary the rotational speed threshold as a function one or more additional operating conditions/parameters. Specifically, in several embodiments, the rotational speed threshold may be varied as a function of both the penetration depth 65 of the disk blades 46 and the ground speed of the agricultural implement 10. For instance, it is generally expected that the rotational speed of the disk blades 46 will increase (or decrease) with increases (or decreases) in the ground speed of the implement 10. Thus, in one embodiment, the threshold speed value associated with the rotational speed threshold may generally be increased with increases in the ground speed and similarly decreased with decreases in the ground speed. Such relationship may then be used when varying the threshold rotational speed as a function of both penetration depth and the ground speed. For instance, the computing system 110 may, in one embodiment, be configured to vary the threshold rotational speed such that: (1) at a constant ground speed, the threshold rotational speed is increased with increases in the penetration depth and is decreased with decreases in the penetration depth; and (2) at a constant penetration depth, the threshold rotational speed is increased with increases in the ground speed and is decreased with decreases in the ground speed.

In several embodiments, to account for variations in the penetration depth and/or the ground speed, the computing system 110 may be configured to utilize one or more look-up tables and/or mathematical relationships to select an appropriate rotational speed threshold. For instance, in one embodiment, the computing system 110 may include a look-up table or mathematical relationship that correlates threshold values for the rotational speed threshold to the ground speed of the implement 10, thereby allowing the computing system 110 to select an initial threshold value based on the current ground speed of the implement 10. Such initial threshold value may then be adjusted or corrected (e.g., up or down), as necessary, based on the current penetration depth 65 of the disk blades 46 (e.g., by scaling or adjusting the initial value based on a known relationship between the penetration depth 65 and the threshold values or disk slippage). In another embodiment, the computing system 110 may include a plurality of ground-speed-dependent look-up tables or mathematical relationships (e.g., one for each of a plurality of different ground speeds) that correlates threshold values for the rotational speed threshold to penetration depths of the disk blades at each ground speed, thereby allowing the computing system 110 to select an appropriate threshold value as a function of the penetration depth and ground speed. In such an embodiment, the computing system 110 may be configured to use suitable interpolation techniques to calculate a threshold value when the current ground speed is between two reference ground speeds for which look-up tables and/or mathematical expressions are stored within the computing system's memory 114.

As shown in FIG. 5, to allow the computing system 110 to monitor the ground speed of the implement 10, the computing system 110 may be communicatively coupled to one or more ground speed sensors 130. In general, the ground speed sensor(s) 130 may correspond to any suitable sensing device or system that is configured to provide data indicative of the ground speed of the implement 10. For instance, in one embodiment, the ground speed sensor 130 may correspond to a GPS device or any other suitable satellite navigation position system configured to generate data associated with the ground speed of the implement 10. In another embodiment, the ground speed sensor(s) 130 may correspond to a rotary speed sensor(s) configured to monitor the rotational speed of a given component that provides an indication of the ground speed of the implement 10, such as the engine 24 or transmission 26 of the work vehicle 12 or a wheel of the vehicle 12 or implement 10.

It should be appreciated that, in alternative embodiments, the rotational speed threshold may also be varied as a function of one or more other conditions and/or parameters in combination with the penetration depth 65 of the disk blade(s) 46. For instance, in addition to the ground speed of the implement 10, slippage of the disk blades 46 may also be affected by one or more field-related operating conditions, such as the crop type previously planted within the field, the percent soil moisture, the soil type, and/or the like.

It should also be appreciated that, in several embodiments, the specific threshold value selected for the disk blades 46 of a given disk gang assembly 44 may differ from the threshold value selected for the disk blades 46 of a different disk gang assembly 44 of the implement 10. For instance, the present inventors have discovered that the relationship between penetration depth 65 and disk slippage (and, thus, the associated relationship between penetration depth 65 and the desired rotational speed threshold) varies from the front disk gang assemblies 44A to the rear disk gang assemblies 44B. Specifically, in many instances, the amount or percentage of slip occurring on the disk blades 46 for the rear disk gang assemblies 44B will vary significantly less with changes in the penetration depth as compared to the disk blades 46 for the front disk gang assemblies 44A. As such, when varying the rotational speed threshold as a function of the penetration depth, the threshold selected for the disk blades 46 of the front disk gang assemblies 44A may differ from the threshold selected for disk blades 46 for the rear disk gang assemblies 44B to accommodate the noted difference in the relationship between penetration depth and disk slippage.

Additionally, in instances in which the correlation between penetration depth and disk slippage for the disk blades 46 of the rear disk gang assemblies 44B is minimal or negligible, the rotational speed threshold for such disk blades 46 may be selected independent of the penetration depth. For instance, in one embodiment, the rotational speed threshold applied for the disk blades 46 of the rear disk gang assemblies 44B may be selected as a function of the ground speed of the implement 10 (without reference to the penetration depth 65 of such blades 46) while the rotational speed threshold for the disk blades 46 of the front disk gang assemblies 44A may be selected as a function of the penetration depth 65 of such disk blades 46 (or as a function of both the penetration depth 65 and the ground speed of the implement 10).

As indicated above, the computing system 110 may be configured to determine or infer the "plugging" status of one or more disk blade(s) 46 by comparing the disk speed of such blade(s) 46 to an associated rotational speed threshold. Moreover, when it is determined that the disk blade(s) 46 are plugged or otherwise in a plugged state (e.g., a partially or fully plugged state), the computing system 110 may be further configured to automatically initiate one or more control actions. For example, the computing system 110 may be configured to provide the operator with a notification that one or more disk blades 46 are in a plugged state. Specifically, in one embodiment, the computing system 110 may be communicatively coupled to the user interface 23 of the work vehicle 12 via a wired or wireless connection to allow notification signals to be transmitted from the computing system 100 to the user interface 23. In such an embodiment, the notification signals may cause the user interface 23 to present a notification to the operator (e.g., by causing a visual or audible notification or indicator to be presented to the operator) which provides an indication that one or more of the disk blades 46 are in a plugged state. In such instance, the operator may then choose to initiate any suitable corrective action he/she believes is necessary, such as adjusting the penetration depth 65 of the disk blades 46 and/or adjusting the ground speed of the implement 10.

Additionally, in several embodiments, the control action(s) executed by the computing system 110 may include automatically adjusting the operation of the implement 10 and/or the associated work vehicle 12. For instance, in one embodiment, the computing system 110 may be configured to automatically adjust the penetration depth 65 of the disk blade(s) 46, such as by actively controlling the operation of the associated disk gang actuator 51 to raise or lower the disk blade(s) 46 relative to the ground when plugging is detected. In another embodiment, the computing system 110 may be configured to automatically adjust the ground speed of the implement 10 to address plugging-related conditions, such as by actively controlling the engine 24 and/or the transmission 26 of the work vehicle 12.

Figure 7:
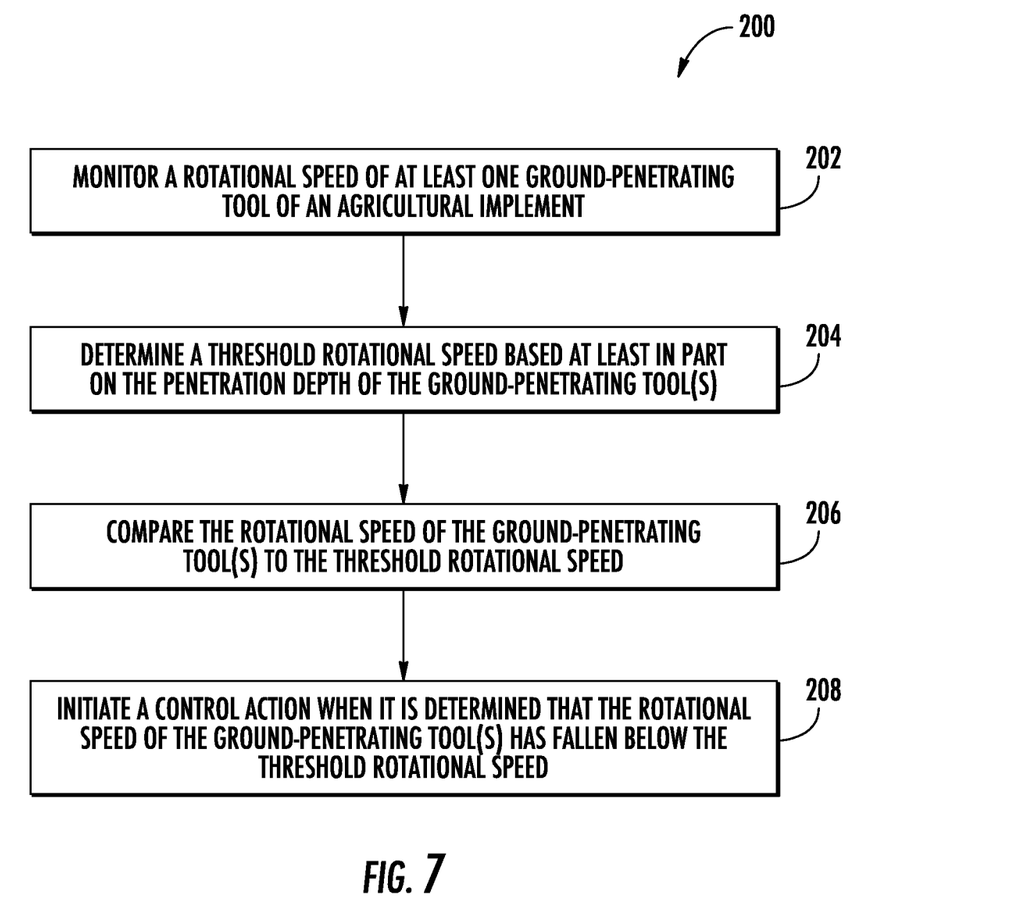
FIG. 7 illustrates a flow diagram of one embodiment of a method for detecting material accumulation relative to rotating ground-penetrating tools of an agricultural implement in accordance with aspects of the present subject matter.

Referring now to FIG. 7, a flow diagram of one embodiment of a method 200 for detecting material accumulation relative to one or more rotating ground-penetrating tools of an agricultural implement is illustrated in accordance with aspects of the present subject matter. In general, the method 200 will be described herein with reference to the agricultural implement 10, disk gang assemblies 44, and system 100 described above with reference to FIGS. 1-5. However, it should be appreciated by those of ordinary skill in the art that the disclosed method 200 may generally be utilized in association with agricultural implements having any suitable implement configuration, ground-penetrating tools having any other suitable tool configuration (e.g., individually mounted blades) and/or systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include monitoring a rotational speed of at least one ground-penetrating tool of an agricultural implement. For instance, as indicated above, the computing system 110 may be configured to monitor the rotational speed of ground-penetrating tools via sensor feedback provided by associated tool speed sensors 80.

Additionally, at (204), the method 200 may include determining a threshold rotational speed based at least in part on the penetration depth of the ground-penetrating tool(s). Specifically, as indicated above, the computing system 110 may be configured to determine or select a threshold value for the rotational speed threshold used to infer the "plugging" status of rotating ground-penetrating tools based on the penetration depth of such tools, thereby allowing the threshold to be varied to accommodate different degrees of slippage occurring at different penetration depths.

Moreover, at (206) and (208), the method 200 may include comparing the rotational speed of the ground-penetrating tool(s) to the threshold rotational speed and initiating a control action when it is determined that the rotational speed of the ground-penetrating tool(s) has fallen below the threshold rotational speed. For example, as indicated above, the computing system 110 may be compare the monitored rotational speed to the applicable speed threshold and determine when such rotational speed falls below threshold. Upon making such a determination, the computing system 110 may be configured to automatically initial a control action, such as be generating an operator notification and/or adjusting the operation of the implement 10 and/or associated work vehicle 12.

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting material accumulation relative to rotating ground-penetrating tools of an agricultural implement, the system comprising:
    an agricultural implement including a frame and at least one rotating ground-penetrating tool supported relative to the frame, the at least one rotating ground-penetrating tool being configured to penetrate into the ground to a given penetration depth;
    a tool speed sensor configured to provide data indicative of a rotational speed of the at least one ground-penetrating tool;
    a computing system communicatively coupled to the tool speed sensor, the computing system being configured to:
        monitor the rotational speed of the at least one ground-penetrating tool based on the data provided by the tool speed sensor;
        determine a threshold rotational speed based at least in part on the penetration depth of the at least one ground-penetrating tool, wherein the threshold rotational speed is varied as a function of the penetration depth such that the threshold rotational speed is increased with increases in the penetration depth and decreased with decreases in the penetration depth; and
        determine when the rotational speed of the at least one ground-penetrating tool falls below the threshold rotational speed.

2. The system of claim 1, further comprising a ground speed sensor configured to provide data indicative of a ground speed of the agricultural implement, the computing system being communicatively coupled to both the tool speed sensor and the ground speed sensor.

3. The system of claim 2, wherein the computing system is further configured to:
    monitor the ground speed of the agricultural implement based on the data provided by the ground speed sensor; and determine the threshold rotational speed based at least in part on both the penetration depth of the at least one ground-penetrating tool and the ground speed of the agricultural implement.

4. The system of claim 3, wherein the threshold rotational speed is varied as a function of the penetration depth of the at least one ground-penetrating tool and the ground speed of the agricultural implement such that: (1) at a constant ground speed, the threshold rotational speed is increased with increases in the penetration depth and is decreased with decreases in the penetration depth; and (2) at a constant penetration depth, the threshold rotational speed is increased with increases in the ground speed and is decreased with decreases in the ground speed.

5. The system of claim 1, wherein the computing system is further configured to automatically initiate a control action when it is determined that the rotational speed of the at least one ground-penetrating tool has fallen below the threshold rotational speed.

6. The system of claim 1, wherein the computing system is configured to determine that the at least one ground-penetrating tool is plugged when the rotational speed of the at least one ground-penetrating tool falls below the threshold rotational speed.

7. An agricultural implement, comprising:
a frame;
a disk gang assembly supported relative to the frame, the disk gang assembly including a plurality of disk blades, the plurality of disk blades of the disk gang assembly being configured to penetrate into the ground to a given penetration depth;
a tool speed sensor configured to provide data indicative of a rotational speed of at least one disk blade of the plurality of disk blades;
a computing system communicatively coupled to the tool speed sensor, the computing system being configured to:
monitor the rotational speed of the at least one disk blade based on the data provided by the tool speed sensor;
determine a threshold rotational speed for the at least one disk blade based at least in part on the penetration depth associated with the at least one disk blade, wherein the threshold rotational speed is varied as a function of the penetration depth such that the threshold rotational speed is increased with increases in the penetration depth and decreased with decreases in the penetration depth; and
determine when the rotational speed of the at least one disk blade falls below the threshold rotational speed.

8. The agricultural implement of claim 7, wherein the disk gang assembly comprises a front disk gang assembly, the implement further comprising:
a rear disk gang assembly supported relative to the frame at a position rearward of the front disk gang assembly relative to a direction of travel of the agricultural implement, the rear disk gang assembly comprising a plurality of disk blades;
a second tool speed sensor configured to provide data indicative of a rotational speed of at least one disk blade of the plurality of disk blades of the rear disk gang assembly; and
wherein the computing system is further configured to:
monitor the rotational speed of the at least one disk blade of the rear disk gang assembly based on the data provided by the second tool speed sensor;
determine a second threshold rotational speed for the at least one disk blade of the rear disk gang assembly, the second threshold rotational speed differing from the threshold rotational speed for the at least one disk blade of the front disk gang assembly; and
determine when the rotational speed of the at least one disk blade of the rear disk gang assembly falls below the second threshold rotational speed.

9. The agricultural implement of claim 7, further comprising a ground speed sensor configured to provide data indicative of a ground speed of the agricultural implement, the computing system being communicatively coupled to both the tool speed sensor and the ground speed sensor.

10. The agricultural implement of claim 9, wherein the computing system is further configured to:
monitor the ground speed of the agricultural implement based on the data provided by the ground speed sensor; and
determine the threshold rotational speed based at least in part on both the penetration depth associated with the disk gang assembly and the ground speed of the agricultural implement.

11. The agricultural implement of claim 10, wherein the disk gang assembly comprises a front disk gang assembly, the implement further comprising:
a rear disk gang assembly supported relative to the frame at a position rearward of the front disk gang assembly relative to a direction of travel of the agricultural implement, the rear disk gang assembly comprising a plurality of disk blades;
a second tool speed sensor configured to provide data indicative of a rotational speed of at least one disk blade of the plurality of disk blades of the rear disk gang assembly; and
wherein the computing system is further configured to:
monitor the rotational speed of the at least one disk blade of the rear disk gang assembly based on the data provided by the second tool speed sensor;
determine a second threshold rotational speed for the at least one disk blade of the rear disk gang assembly based at least in part on the ground speed of the agricultural implement, the second threshold rotational speed differing from the threshold rotational speed for the at least one disk blade of the front disk gang assembly; and
determine when the rotational speed of the at least one disk blade of the rear disk gang assembly falls below the second threshold rotational speed.

12. The agricultural implement of 8, wherein the computing system is further configured to automatically initiate a control action when it is determined that the rotational speed of the at least one ground-penetrating tool has fallen below the threshold rotational speed.

13. The agricultural implement of 8, wherein the computing system is configured to determine that the at least one ground-penetrating tool is plugged when the rotational speed of the at least one ground-penetrating tool falls below the threshold rotational speed.

14. A method for detecting material accumulation relative to rotating ground-penetrating tools of an agricultural implement, the agricultural implement including a frame and at least one rotating ground-penetrating tool supported relative to the frame, the at least one rotating ground-penetrating tool being configured to penetrate into the ground to a given penetration depth, the method comprising:
monitoring, with a computing system, a rotational speed of the at least one ground-penetrating tool;

determining, with the computing system, a threshold rotational speed based at least in part on the penetration depth of the at least one ground-penetrating tool, wherein the threshold rotational speed is varied as a function of the penetration depth such that the threshold rotational speed is increased with increases in the penetration depth and decreased with decreases in the penetration depth;

comparing, with the computing system, the rotational speed of the at least one ground-penetrating tool to the threshold rotational speed; and initiating, with the computing system, a control action when it is determined that the rotational speed of the at least one ground-penetrating tool has fallen below the threshold rotational speed.

15. The method of claim 14, further comprising monitoring a ground speed of the agricultural implement;

wherein determining the threshold speed comprises determining the threshold rotational speed based at least in part on both the penetration depth of the at least one ground-penetrating tool and the ground speed of the agricultural implement.

16. The method of claim 15, wherein determining the threshold speed comprises varying the threshold rotational speed as a function of the penetration depth of the at least one ground-penetrating tool and the ground speed of the agricultural implement such that: (1) at a constant ground speed, the threshold rotational speed is increased with increases in the penetration depth and is decreased with decreases in the penetration depth; and (2) at a constant penetration depth, the threshold rotational speed is increased with increases in the ground speed and is decreased with decreases in the ground speed.

17. The method of claim 14, wherein initiating the control actions comprises at least one of providing an operator notification to an operator of the agricultural implement or automatically adjusting the operation of the agricultural implement or a work vehicle configured to tow the agricultural implement.

* * * * *